United States Patent [19]

Bommer

[11] Patent Number: 4,857,183

[45] Date of Patent: Aug. 15, 1989

[54] APPARATUS FOR PURIFYING AND NEUTRALIZING RESIDUES FROM FURNACES

[76] Inventor: Rolf Bommer, Hochbildstrasse 21, 7770 Ueberlingen, Fed. Rep. of Germany

[21] Appl. No.: 144,472

[22] Filed: Jan. 15, 1988

[30] Foreign Application Priority Data

Jan. 22, 1987 [DE] Fed. Rep. of Germany ... 8700987[U]

[51] Int. Cl.⁴ .............................................. B01D 23/14
[52] U.S. Cl. ..................... 210/127; 210/255; 210/265; 210/266; 210/284; 261/DIG. 9
[58] Field of Search ................ 261/DIG. 9; 110/215; 55/228, DIG. 13; 210/252, 255, 257.2, 202, 265, 702, 724, 127, 199, 266, 284

[56] References Cited

U.S. PATENT DOCUMENTS

| | | | |
|---|---|---|---|
| 3,387,432 | 6/1968 | Ferrara | 55/228 |
| 3,756,171 | 9/1973 | De Bord | 110/8 R |
| 4,187,187 | 2/1980 | Turbeville | 252/62.54 |
| 4,443,341 | 4/1984 | Miller et al. | 210/702 |
| 4,529,421 | 7/1985 | Parma | 55/228 |

Primary Examiner—W. Gary Jones
Assistant Examiner—Matthew Savage
Attorney, Agent, or Firm—Eugene E. Renz, Jr.

[57] ABSTRACT

An apparatus for purifying and neutralizing residues from furnaces burning liquid or gaseous fuels comprising a settling tank having an inlet for the liquid containing the residues, at least one oil absorption body in the settling tank, and a clean water tank separated from the settling tank by at least one filter. The pH in the clean water tank is raised, and a filtration unit contains activated carbon between the clean water tank and outlet.

22 Claims, 5 Drawing Sheets

APPARATUS FOR PURIFYING AND NEUTRALIZING RESIDUES FROM FURNACES

FIELD OF THE INVENTION

The invention pertains to a device for the purification and neutralization of residues from furnaces burning liquid or gaseous fuels, especially calorific value boilers.

BACKGROUND OF THE INVENTION

In heating boilers, which are referred to as calorific value boilers, the flue gases from the furnace are cooled below the dew point, so that the water vapor present in the flue gases condenses and precipitates together with the pollutants and other combustion residues present in the flue gases. Because of the sulfur present in these liquid or gaseous fossil fuels, this condenstate contains sulfur oxides and is, therefore, highly acidic.

In the known calorific value boilers for residential heating systems, this condensate is neutralized by raising the pH value and discharged into the sewer. The oil droplets reaching the boiler especially when the burner is turned on and off and the dissolved and undissolved hydrocarbons present in the condensate as a result of incomplete combustion also wind up in the sewer and contaminate the environment. To clean a boiler, it is standard practice after a dry cleaning to send the residues obtained, which are high in pollutants, to the dump, where they lead to environmental pollution; whereas, when a wet cleaning method is sued, the pollutants wind up for the most part in the sewer system and hinder the biological clarification of the waste water.

SUMMARY OF THE INVENTION

The device according to the invention operates in two stages. First, the condensate which forms in the furnace boiler or the cleaning water obtained from a wet cleaning of the furnace boiler is conducted through a water receiver to a settling tank. The water is allowed to stand in the settling tank so that the heavier particles of, for example, ash and soot present in the water can fall to the bottom. The unburned oil droplets present in the water collect at the surface. The oil droplets are absorbed by oil absorbers, which consist of a material known in itself, such as that described in West German Pat. No. 2,306,916 C3. The oil absorbers, in the form of cubes or spheres, can float on the surface of the water in the settling tank, or they can be immersed in the water, especially in the uppermost layer of water, as a plate or as bodies of some other shape. The sludge of heavier particles settling on the bottom of the settling tank can preferably be removed through a drain. The water, thus cleaned of oil and solid particles, is then sent through a filter to a clean water tank. The filter is preferably designed as a filter plate, which separates the settling tank form the clean water tank. The filter plate consists preferably of a water-permeable rigid plastic foam, especially an open-cell polyurethane foam described in West German Pat. No. 2,306,916. This filter allows the water with the substances still dissolved in it to pass through, but effectively prevents oil droplets and solids from passing.

In the clean water tank, the pH of the water is raised to an allowable value, for which purpose preferably marble granulate which is, of course, calcium carbonate is used, or a basic liquid can be supplied in measured amounts. The water neutralized in this way is discharged from the clean water tank by way of an activated carbon filter in to the sewer. Essentially the dissolved and undissolved hydrocarbons still present in the water are absorbed in the activated carbon filter. Accordingly, the water reaching the sewer is of drinking water quality.

In the settling tank it is preferred to provide a float switch, which turns off the burner of the furnace when the level of the liquid in the settling tank rises too high, which means that the system cannot accept any more condensate.

The neutralized water of the clean water tank can also be pumped out and sent to a flue gas washer for desulfurization. The wash water, which has become acidic again through the process of desulfurizing the flue gases, is returned to the purification system. To ensure in this case that there is always enough water in the clean water tank for the desulfurization of the flue gases, a float switch is also provided in the clean water tank, which controls a fresh water feed line and ensures a sufficient water level in the clean water tank.

Because the flue gas washer requires a relatively high water throughput, the pH is raised in this case in a preferred exemplary embodiment by two separate marble granulate tanks. The water is pumped to the flue gas washer by way fo a first marble granulate tank with a high water throughput. Because of the high water throughput, neutralization is not complete, the water being sent to the flue gas washer still having a pH value of about 5–6. This slightly acidic wash water is still suitable for the operation of the flue gas washer. The highly acidic wash water emerging from the flue gas washer is returned to the purification system.

The water from the clean water tank is conducted via the activated carbon filter to the sewer by way of a second marble granulate tank with a low water throughput. Only the water overflowing from the clean water tank, which is produced by the continuously incoming condensate, flows by way of the second marble granulate tank and the activated carbon filter. Only this much smaller overflow of about 0.6 kg per liter of heating oil loads the activated carbon filter, which means that this filter has to be replaced only at infrequent intervals. The slow overflow means that the water throughput through the marble granulate is low, so that the water can remain in contact with the marble granulate for a longer period of time; the pH is thus raised to 6.5–7.0. The water can thus be safely discharged into the sewer.

The wash water obtained according to the invention can be used to operate an extremely simple flue gas washer. This consists of a gas-permeable grate inserted in a pipe through which the flue gases flow. A bed of ceramic packing material through which the wash water drips is provided on the grate. The flue gas washer can also be designed to function as a sound damper.

With the foregoing in mind, it is an object of the present invention to provide a new and improved apparatus for collecting residues from a furnace. To this end, the apparatus comprises a settling tank having an inlet for the liquid containing the residues, at least one oil absorption body in the settling tank, a clean water tank separated from said settling tank by at least one filter, means for raising the pH in the clean water tank, and a filtration unit containing activated carbon between the clean water tank and outlet.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
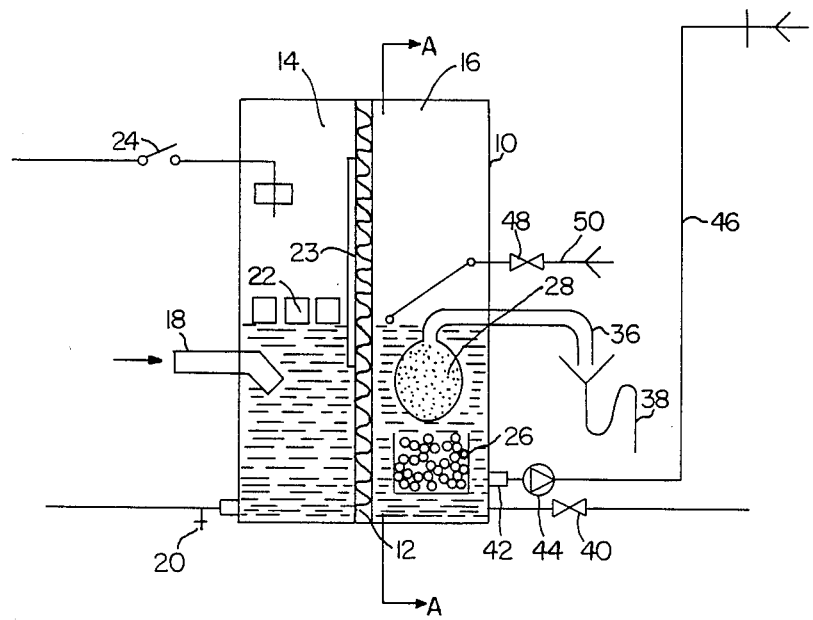
FIG. 1 is a schematic diagram in cross section of a first embodiment of the device.
Figure 3:
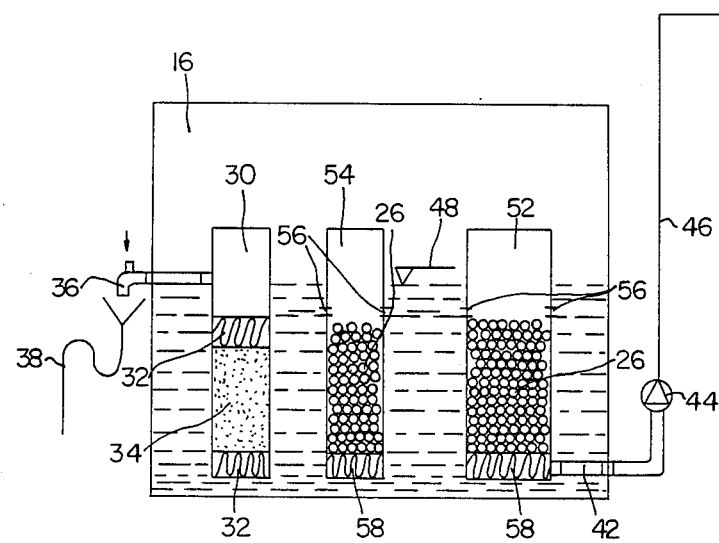
FIG. 3 is a section along line A—A of FIG. 1 in a second embodiment of the device.

The device in the embodiment of FIGS. 1 and 3 has a rectangular tank 10, which is separated by a filter plate 12 into a settling tank 14 and a clean water tank 16. Filter plate 12 consists of an open-cell polyurethane foam, which is permeable to water but which does not allow oil droplets or solid particles to pass through.

A feed line 18 leads to settling tank 14. Through this feed line 18 the condensate from the furnace boiler and the cleaning water from the wet cleaning of the boiler are supplied by way of a water receiver. At the bottom of settling tank 14 there is a drain opening 20, through which the sludge of solid material which has settled on the bottom can be removed. Further, oil absorbers 22 are also provided in settling tank 14. These absorbers float in the settling tank on the surface of the liquid. Oil absorbers 22 can float freely as cubes on the surface of the liquid or in the form of smaller bodies or spheres in a net-like cushion. It is also possible to provide an oil-absorbing plate 23 instead of the oil absorbers floating on the surface. This plate can be attached to and rest against filter plate 12. The lower end of oil-absorbing plate 23 projects into the liquid to absorb the oil collecting on the surface of the liquid, but leaves free most of the surface of filter plate 12 situated below the surface of the liquid to allow free passage for the liquid.

Below the upper edge of settling tank 14 there is a float switch 24, which turns off the burner of the furance when the level of the liquid in settling tank 14 approaches the upper edge of tank 10, which means that the system can no longer accept any more water.

Figure 2:
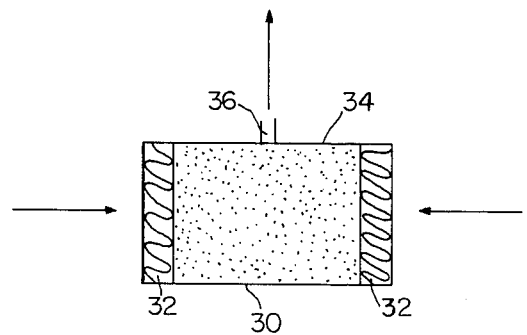
FIG. 2 is a cross section of the activated carbon filter of this device.

In accordance with the embodiment of the invention shown in FIG. 1, marble granulate 26 is provided in a basket in clean water tank 16 to raise the pH. Alternatively, a metering feed line 26a for a basic liquid could be used. An activated carbon filter 28 is also provided in clean water tank 16. A vertical section of this filter is shown separately in FIG. 2. Activated carbon filter 28 consists of a can-like housing 30, the side walls 32 of which consist of a water-permeable rigid plastic foam, preferably again an open-cell polyurethane foam. Housing 30 holds the activated carbon 34. The water entering through side walls 32 is purified in activated carbon 34. In particular, the dissolved and undissolved hydrocarbons are absorbed. The water then exits activated carbon filter 28 and clean water tank 16 through an outlet 36 and arrives at a connector 38 to the sewer system.

The water can also be let out of tank 10 by way of a shut-off valve 40.

Finally, clean water tank 16 has an outlet 42, through which water can be pumped out to a flue gas washer 46 by means of a pump 44. Another float switch 48 installed in clean water tank 16 controls a fresh water feed line 50, so that it is ensured that there is always a sufficient supply of water in clean water tank 16 for flue gas washer 46.

Filter plate 12, oil absorbers or oil absorption plate 23, marble granulate 26, and activated carbon filter 28 are, of course, replaceable, which means that they can be renewed as needed.

In accordance with the embodiment of the invention shown in FIG. 3, two tanks 52,54 filled with marble granulate 26 are provided in clean water tank 16. Tanks 52,54, which can be cylindrical, have inlet openings 56 for the liquid in their upper area below the liquid level determined by overflow pipe 36.

In the lower part of tank 52, which has a relatively large cross section, outlet 42 is provided, through which pump 44 conveys the water to flue gas washer 46. A filtration layer 58 of, for example, water-permeable rigid plastic foam such as an open-cell polyurethane foam prevents marble granulate 26 from entering outlet 42.

The second tank 54 has a smaller cross section and is connected by way of a pipe 37 near the bottom to a housing 30, which holds the activated carbon filter 34 closed off by boundary walls 32. Overflow pipe 36 exits from housing 30 at a level which determines the level of the liquid in pure water tank 16 and proceeds to vented sewer connection 38.

The water entering clean water tank 16 through filter plate 12 passes through inlet openings 56 into marble granulate tank 52 and is conveyed by pump 44 to flue gas washer 46. From flue gas washer 46, the water flows back again to feed line 18 of the settling tank. The water, which is being pumped by pump 44 at a relatively high throughput of about 300 liters/hour through flue gas washer 46, is thus returned in its entirety to the system, so that the level of the liquid in the system remains virtually unchanged.

Because of pump 44 and the cross section of marble granulate tank 52, the water flows through marble granulate 26 quickly, and therefore the pH of the water is raised to about 5-6 as it passes through marble granulate tank 52. In flue gas washer 46, the wash water takes up sulfur oxides again, so that it flows back to the settling tank and clean water tank 16 with a much lower pH.

The acidic liquid in clean water tank 16 also passes through inlet openings 56 into marble granulate tank 54. When the level of the liquid in clean water tank 16 rises beyond the level of outlet 36, the water flows through marble granulate 26 of tank 54 and activated carbon filter 28 via outlet 36 into the sewer. Because tank 54 has a smaller diameter and because the liquid is not pumped through outlet 36, the contact time between the water and marble granulate 26 in tank 54 is longer, which means that the pH of the liquid is raised to a greater extent and the water reaches the sewer from outlet 36 with a pH of about 6.5-7.0.

Figure 4:
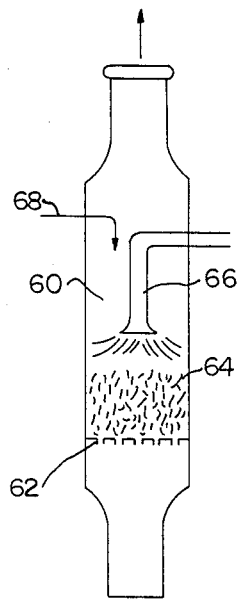
FIG. 4 is a vertical axial section through a flue gas washer.

A flue gas washer 46 as preferably used is shown in FIG. 4. Flue gas washer has a pipe 60, through which the flue gases are conducted vertically from the bottom to the top. A gas-permeable, horizontal grate 62 is installed in the pipe; this grate has a mesh width of about 12-15 mm. A bed of ceramic packing material 64 with a depth of about 100–150 mm rests on grate 62. The wash water is pumped through a water inlet 66 at a rate of preferably about 300 liters/hour from the top over the packing 64, through which the water then drips. A supplemental fresh water inlet 68 goes into action whenever the amount of condensate is insufficient to supply enough wash water via pump 44.

The flue gas washer serves to remove sulfur dioxide, soot particles, dust, ash, and other oil-specific residues from the flue gases. The wash water emerging from the bottom of flue gas washer 46 is sent back to the system via feed line 18.

The loose ceramic packing material 64 offers only a slight resistance to the flow of the flue gases, generating a pressure drop of about 1–4 mm $H_2O$. This is enhanced by the fact that pipe 60 is expanded to a diameter of 150–180 by comparison to the flue gas pipe, which has a diameter of only about 80–100 mm. The upper end of flue gas washer 46 is connected in a gas-tight manner to the flue gas pipe leading to the stack.

Figure 5:
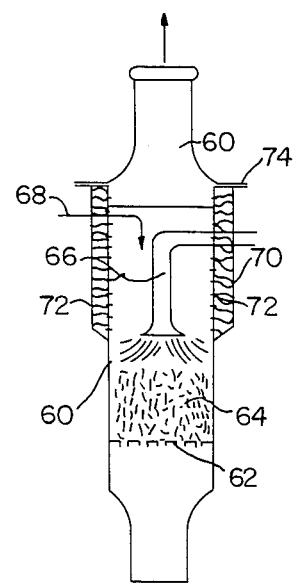
FIG. 5 is a vertical axial section through a modified form of the flue gas washer.

In the exemplary embodiment of FIG. 5, pipe 60 of flue gas washer 46 in FIG. 3 is surrounded in its upper area by a corrosion-resistant pipe 70 of larger diameter, which is connected at the bottom tightly to pipe 60. Pipe 60 of the flue gas washer is provided with holes 72 in the area of outer pipe 70. The intermediate space between pipes 60 and 70 is packed with an acid-resistant, preferably ceramic insulating material 74 such as the ceramic insulating material 64 described above. Through this design, flue gas washer 46 functions simultaneously as a sound damper.

Figure 6:
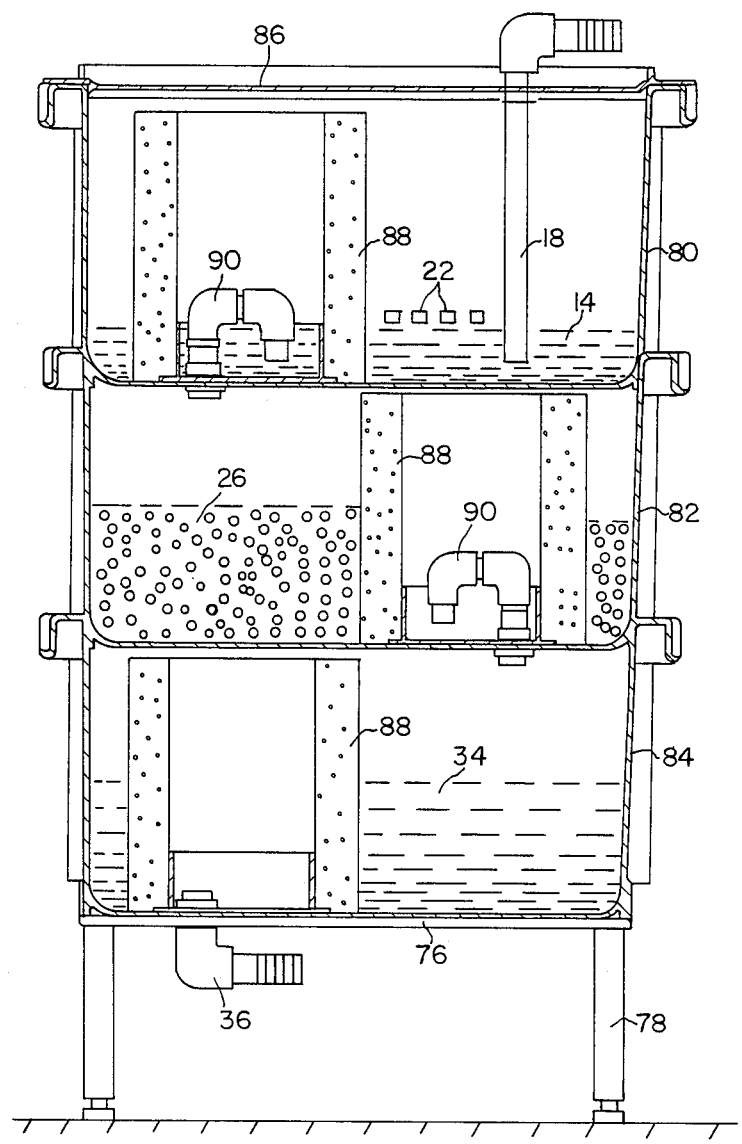
FIG. 6 is a vertical section through a third embodiment of the device.

FIG. 6 shows an exemplary embodiment of a device which has been found reliable in practice and which is characterized by an especially simple and compact design.

A stand, consisting of a frame 76 and four feet 78 of square steel tubing, supports a stack of three rectangular plastic tanks 80, 82, and 84. Feed line 18 leads vertically from above into the topmost tank 80, which is closed by a cover 86. Upper tank 80 serves as settling tank 14 and holds oil absorbers 22. In tank 80 there is a cylindrical insert 88, which corresponds to filter plate 12 of the preceding designs and which consists, like them, of open-cell polyurethane foam. Insert 88 surrounds an overflow pipe 90, which leads to middle tank 82. The condensate or cleaning water supplied through feed line 18 stands at a certain level in upper tank 80, this level being determined by overflow pipe 90. Solid components settle out in upper tank 80. Oil residues are taken up by oil absorbers 22. After it has been filtered through insert 88, the liquid passes via overflow pipe 90 to middle tank 82. Middle tank 82 is filled with marble granulate 26. Middle tank 82 also has an insert 88 of open-cell polyurethane foam, which encloses an overflow pipe 90. The liquid coming from upper tank 80 stands in middle tank 82 at the level determined by overflow pipe 90 and is neutralized by marble granulate 26. The filtered and neutralized liquid passes via overflow pipe 90 to lower tank 84, which is filled with activated carbon 34. A cylindrical insert 88 of polyurethane foam is also provided in lower tank 84; this insert surrounds overflow pipe 36. Organic substances such as especially any hydrocarbons which may still be present in the purified and neutralized condensate are trapped in lower tank 84.

If needed, it is also possible in the design of FIG. 6 to connect a flue gas washer. In this case, the connecting line for the flue gas washer at middle tank 82 would be installed below the level of overflow pipe 90, so that only a slight excess of condensate reaches outlet 36 via lower tank 84.

It is also possible to install a hose or pipe with outlet openings at the bottom of middle tank 82. Water can be introduced under pressure through these openings to back-wash marble granulate 26. This washing loosens and cleans the bed of marble granulate 26, so that the active surface of the marble granulate is regenerated.

SUMMARY

For the purification and neutralization of the condensate from a calorific value boiler, the condensate is conducted to a settling tank (14), in which solid components settle out and oil components are taken up by oil absorbers (22). The purified condensate is conducted by way of a filter (88) to marble granulate (26) for neutralization and then pumped through activated carbon (34) before it is discharged through an outlet (36) into the sewer system.

What is claimed is:

1. Apparatus for purifying and neutralizing residues from furnaces burning liquid or gaseous fuels comprising a settling tank (14,80) having an inlet (18) for the liquid containing the residues, at least one oil absorption body (22,23) in the settling tank (14,80), a clean water tank (16,82) separated from said settling tank (14,80) by at least one filter, means for raising the pH in the clean water tank (16,82), and a filtration unit containing activated carbon (34) between the clean water tank (16,82) and outlet (36) said apparatus including means for conveying fluids from said inlet to said outlet.

2. Apparatus according to claim 1, wherein said filter is a filter plate (12) disposed between said settling tank (14) and said clean water tank (16).

3. Apparatus according to claim 2, wherein said filter (12) consists of an open-cell polyurethane foam.

4. Apparatus according to claim 2, wherein said oil absorption body comprises a plate (23) which rests against the filter plate (12).

5. Apparatus according to claim 1, wherein said filter is an insert (88) placed in the settling tank (80), said insert surrounding an overflow (90) leading to the clean water tank (82).

6. Apparatus according to claim 3, wherein said insert (88) consists of an open-cell polyurethane foam.

7. Apparatus according to claim 1, wherein at least one oil absorbent body (22) floats freely on the surface in the settling tank (14,80).

8. Apparatus according to claim 1, wherein said settling tank (14) has a drain (20) near the bottom.

9. Apparatus according to claim 1, wherein said settling tank (14) has a float switch (24) to shut off the furnace.

10. Apparatus according to claim 1, wherein said means for raising the pH comprises marble granulate (26).

11. Apparatus according to claim 1, wherein said means for raising the pH comprises a metering feed line for a basic liquid.

12. Apparatus according to claim 1, wherein said filtration unit containing the activated carbon has a water inlet covered by a filtration layer.

13. Apparatus according to claim 12, wherein said filtration unit includes a housing (30) to hold the activated carbon (34) having walls (32) consisting of an open-cell polyurethane foam.

14. Apparatus according to claim 12, wherein said filtration unit containing the activated carbon comprises a tank (84) filled with activated carbon (34), and including a filter insert (88) installed in the clean water tank (82) surrounding an overflow pipe (90) leading to the tank (84) filled with activated carbon (34).

15. Apparatus according to claim 1, wherein said clean water tank (16) has an outlet (42) provided with a pump (44) to convey fluid to a flue gas washer (46).

16. Apparauts according to claim 15, wherein said clean water tank (16) has a fresh water feed line (50) controlled by a float switch (48).

17. Apparatus according to claim 15, including a tank (52) installed in the clean water tank (16) and filled with marble granulate (26) connected to the outlet (42) leading to the flue gas washer (46).

18. Apparatus according to claim 1, including a tank (54) installed in the clean water tank (16) and filled with marble granulate (26) said tank having an outlet (37) connected to the filtration unit containing activated carbon.

19. Apparatus according to claim 1, wherein said settling tank (80), said clean water tank (82), and said filtration unit containing the activated carbon (34) are stacked on top of each other and are plastic tanks connected to each other by overflow pipes (90).

20. Apparatus according to claim 1, including a flue gas washer (46), having a vertical pipe (60) through which the flue gases flow, in which pipe ceramic packing material (64) rests on a gas-permeable grate (62) and in which wash water drips through the packing from above.

21. Apparatus according to claim 20, wherein said flue gas washer (46) has a water inlet (66) connected by way of the pump (44) to the clean water tank (16) and also has a fresh water inlet (68).

22. Apparatus according to claim 20, wherein said pipe (60) of the flue gas washer (46) is surrounded by an outer pipe (70), said pipe (60) of the flue gas washer (46) having radial holes (72) in the area of the outer pipe (70), and wherein the intermediate space between the pipe (60) and the outer pipe (70) is packed with a preferably ceramic, acid-resistant insulation material (74).

* * * * *